Nov. 15, 1960  J. F. O'MAHONEY, JR  2,960,426
ADHESION OF BUTYL RUBBER CURED WITH
DIMETHYLOL PHENOLS TO CUPROUS METAL
Filed May 27, 1957
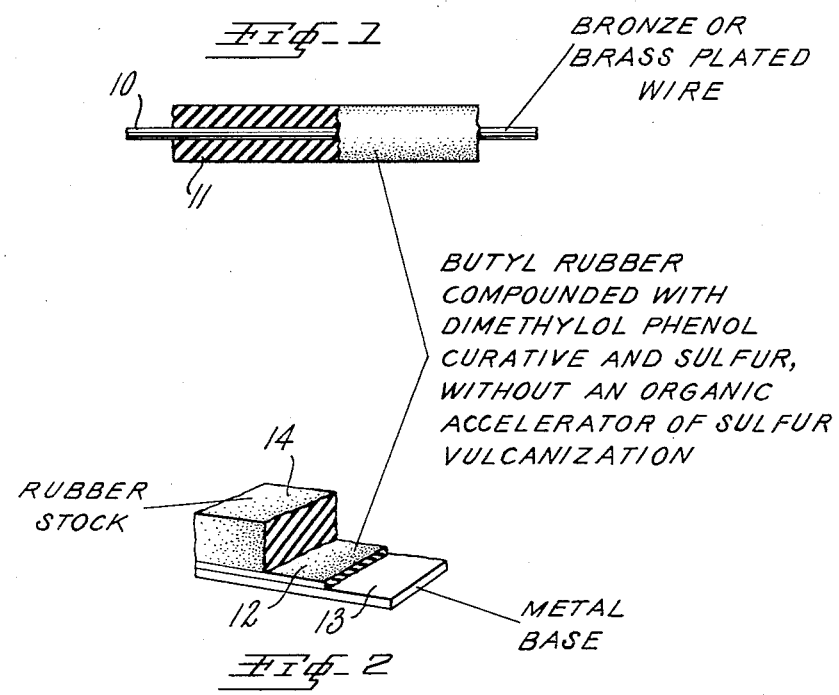
INVENTOR.
J. F. O'MAHONEY, JR.
BY
AGENT

United States Patent Office 2,960,426
Patented Nov. 15, 1960

2,960,426

ADHESION OF BUTYL RUBBER CURED WITH DIMETHYLOL PHENOLS TO CUPROUS METAL

Joseph F. O'Mahoney, Jr., Indianapolis, Ind., assignor to United States Rubber Company, New York, N.Y., a corporation of New Jersey Filed May 27, 1957, Ser. No. 661,802

6 Claims. (Cl. 154—130)

This invention relates to a method of adhering resin-curing butyl rubber to metal. More particularly, the invention pertains to an improved method of adhering butyl rubber to cuprous metal, involving compounding the butyl rubber with a 2,6-dimethylol-4-hydrocarbyl phenol and sulfur. The invention is also concerned with adhesive butyl rubber compositions and laminates.

Pneumatic tires have been constructed from sulfur curing butyl rubber, that is, the rubbery copolymer of an isoolefin with a polyolefin, because such rubber offers many advantages. Tires made from sulfur curing butyl rubber are quiet, soft riding, provide good traction, and resist the deteriorating action of air, heat, ozone and sunlight. As disclosed in U.S. Patent No. 2,701,895 (Tawney and Little, February 15, 1955), resin curing butyl rubber offers greatly improved resistance to the deterioration of heat over sulfur curing butyl rubber. Such improvement would enhance the quality of a butyl rubber tire. Unfortunately, however, it has not heretofore been possible to manufacture resin curing butyl rubber tires of satisfactory quality because resin curing butyl is so difficult to adhere to other materials. Thus, one essential part of a pneumatic tire is the bead wire that is used to reinforce the bead area of the tire and render such area inextensible so the tire will stay on the wheel rim. Resin curing butyl rubber, unlike sulfur curing butyl rubber or the typical highly unsaturated rubbers such as natural rubber or GR-S (synthetic styrene-butadiene copolymer rubber), cannot be made to adhere well to bead wire, by any adhesive composition or method previously known to the art, insofar as the present inventor is advised. Therefore, resin curing butyl rubber tires made by conventional methods are subject to early failures by separation of the bead wire from the rubber. As can readily be appreciated, this has been a most serious obstacle to commercial acceptance of resin curing butyl rubber tires.

I have now found, unexpectedly, that if butyl rubber is compounded with a 2,6-dimethylol-4-hydrocarbyl phenol and with sulfur, and thereafter subjected to vulcanizing conditions in contact with a cuprous metal body, such as a tire bead wire, the butyl rubber most surprisingly adheres to the wire with remarkable tenacity. This is indeed a noteworthy result, in view of the fact that butyl rubber compounded with a 2,6-dimethylol-4-hydrocarbyl phenol in the absence of sulfur normally results in adhesion that is so negligible that tthe metal may be separated from the butyl rubber by easy hand manipulation.

This is more noteworthy because sulfur curing butyl rubber stocks and resin curing butyl rubber stocks are so incompatible as to permit no appreciable quantity of one kind of stock to be vulcanized with the other. Indeed, normally the one vulcanizing system seems to poison or inhibit the other to such an extent that each must not be mixed with the other.

The invention will be described in detail with reference to the accompanying drawing, wherein:

Fig. 1 is a fragmentary longitudinal view, with portions broken away, of a bead wire coated with adhesive butyl rubber stock of the invention; and, Fig. 2 is a fragmentary perspective view, with parts broken away, of a modified form of laminate of the invention.

It will be understood that the term "butyl rubber" is used herein in its ordinary sense to denote the type of synthetic rubber made by copolymerizing an isoolefin, usually having from 4 to 8 carbon atoms per molecule, with a minor proportion of a polyolefin, usually one having from 4 to 18 carbon atoms. Such isomonoolefins as isobutylene or ethyl methyl ethylene are preferred. The multi-olefinic unsaturate usually is an aliphatic conjugated diolefin having from 4 to 6 carbon atoms, and is preferably isoprene or butadiene. Other suitable diolefins that may be mentioned are such compounds as piperylene; 2,3-dimethyl butadiene-1,3; 1,2-dimethyl butadiene-1,3; 1,3-dimethyl butadiene-1,3; 1-ethyl butadiene-1,3 and 1,4-dimethyl butadiene-1,3. The butyl rubber contains only relatively small amounts of copolymerized diene, typically from about 0.5 to 5%, and seldom more than 10%, on the total weight of the elastomer. In practice, the butyl rubber can be modified, either by including other monomers (e.g., chloroprene, allyl chloride, methallyl chloride) during the preparation of the copolymer, or the copolymer may afterwards be subjected to reactive reagents, such as halogens (e.g., chlorine, bromine) in accordance with known procedures. Examples of commercially available forms of unmodified or modified isoolefin-polyolefin rubbery copolymers suitable for use in the invention include "Butyl 218" (an unmodified isobutylene-isoprene copolymer), "Butyl B-11" (the latter being a chlorinated copolymer), and "Hycar 2202" (the latter being a brominated copolymer).

The 2,6-dimethylol-4-hydrocarbyl phenols with which the butyl rubber is compounded for purposes of the present invention are those disclosed as curatives for butyl rubber in U.S. Patent No. 2,701,895, Tawney and Little, February 15, 1955. These materials are typically made from a para-alkylphenol and formaldehyde in the presence of alkali. They are preferably employed in the form of their resinous self-condensation products. They are oil-soluble materials of the resol type, being reactive because of their terminal methylol groups. They are distinguished from the novolacs, which are made in acid medium, with less formaldehyde, and which contain no methylol groups and therefore are not reactive. The novolacs will not cure butyl rubber and they are not operable in the present invention. Although the 2,6-dimethylol-4-hydrocarbyl phenols are reactive, they are not to be confused with the ordinary thermosetting phenol-formaldehyde condensate. The latter contains three available reactive positions (two ortho positions and the para position) and forms insoluble, infusible three-dimensional cross-linked products. Such thermosetting phenolic resins do not cure butyl rubber, and they are not operative in the present invention. The 2,6-dimethylol-4-hydrocarbyl phenols, in contrast, contain only two reactive positions (the third being "blocked" by the para substituent) and they can therefore undergo only linear condensation.

Examples of 2,6-dimethylol-4-hydrocarbyl phenols suitable for use in the invention include 2,6-dimethylol-4-tertiary-butyl phenol; 2,6-dimethylol-4-octyl phenol; 2,6-dimethylol-4-phenyl phenol; 2,6-dimethylol-4-benzyl phenol; 2,6-dimethylol-4-dodecyl phenol; 2,6-dimethylol-4-(alpha,alpha-dimethylbenzyl) phenol and 2,6-dimethylol-4-cyclohexyl phenol. It will be observed that in the foregoing materials, the para- or 4-substituent is an alkyl, cycloalkyl, aryl, or aralkyl radical. Preferred compounds are those in which the para substituent is a lower alkyl group (containing, for example, 2 to 8 carbon atoms). Although these may be used in essentially monomeric form, it is in the form of their resinous self-condensation products that they are preferred.

For purposes of the invention, 100 parts by weight of the butyl rubber (in which category I include both the unmodified and modified forms of isoolefin-polyolefin copolymers described above) is mixed with from 3 to 20 parts, and preferably from 5 to 12 parts, of the 2,6-dimethylol-4-hydrocarbyl phenol curative, preferably in the form of its resinous self-condensation product. Such mixing may be accomplished with the aid of suitable conventional rubber mixing equipment, such as an internal mixer or an open roll mill. Conventional mixing temperatures are suitable, care being taken not to mix the material at excessively high temperatures or for excessively long periods of time, otherwise the mix is likely to become "scorched" or undesirably precured instead of remaining essentially in an unreacted state of mere physical admixture, which is all that is desired at this stage.

The remaining essential ingredient of the adhesive stock of the invention is sulfur, which I have found it necessary to employ in amount of from 0.1 to 20 parts, and preferably from 1 to 5 parts, per 100 parts of butyl rubber. The sulfur may be mixed in before, or after, or simultaneously with the dimethylol phenol curative.

It is preferable to include also in the adhesive stock mixture an accelerator for the 2,6-dimethylol-4-hydrocarbyl phenol curative. Such accelerator may be, for example, a heavy metal halide (U.S. Patent No. 2,726,224, Peterson and Batts, December 6, 1955), polychloroprene (U.S. Patent No. 2,734,877, Batts and Delang, February 14, 1956), chlorosulfonated polyethylene (U.S. Patent No. 2,734,039, Peterson and Batts, February 7, 1956), or chlorinated paraffin wax (U.S. Patent No. 2,727,874, Peterson and Batts, December 20, 1955), usually in amount of from about 0.3 to 20 parts, depending on the particular accelerator.

However, it is desired to inject a caution against the use of any organic accelerator of sulfur-vulcanization in the present invention. Such accelerators appear to somehow "poison" the present adhesive system as it were, and lead to very unsatisfactory results.

Preferably I include also in the adhesive stock mixture suitable reinforcing materials or fillers, such as carbon black, floc, zinc oxide, and the like (usually in amount of from 5 to 80 parts), as well as minor amounts of conventional compounding ingredients, such as processing aids, antioxidants, softeners, tackifiers, etc.

The foregoing vulcanizable butyl rubber mixture, while still in the unreacted state, is applied to the cuprous metal body to which it is desired to adhere the stock. In the case of wire, this is conveniently accomplished by extruding the raw butyl rubber stock, containing the dimethylol phenol curative, sulfur, and other desired ingredients, around the wire in the conventional extrusion machines available for this purpose. Alternatively, the raw butyl rubber stock, compounded as described, may be wrapped around or applied to the wire or other metal body in the form of a previously prepared sheet, made in any convenient manner, such as by calendering the raw butyl rubber stock. The butyl rubber stock itself may be reinforced if desired with, for example, fabric, in which case it may take the form of a bead wrapping or flipper strip.

In the embodiment of the invention shown in Fig. 1, a butyl rubber stock, compounded as described, is shown as a covering 10, surrounding a wire 11, such as a bead wire.

In the embodiment of the invention shown in Fig. 2, a butyl rubber layer 12, compounded in accordance with the invention, is shown applied to a metal base 13, and a further body 14 of another rubber stock, such as conventionally resin compounded butyl rubber (containing, for example, 3 to 20 parts of the resin curative), is shown applied over the bonding layer 12 of the invention. In this form of the invention the butyl rubber layer 12 compounded in accordance with the invention acts as an intermediate adhesive layer for bonding the conventionally resin compounded stock 14 to the metal base 13. The layers 12 and 14 are assembled with the base 13 in an unvulcanized state.

The next essential step is to subject the laminate to vulcanizing conditions. Such vulcanizing conditions may be any of those conventionally employed in vulcanizing rubber goods such as tires, belts, inner tubes, footwear and the like. It may be mentioned, by way of non-limiting example, that temperatures of from 150° to 250° C., maintained for a period of from ¼ to 24 hours, are frequently suitable. It will be understood that the temperature and time of vulcanization will in general be inversely related, and the exact combination of temperature and time that is optimum in any given instance will of course depend on such variables as the quantity of dimethylol phenol curative employed, the presence or absence of accelerator for such curative, the size of the article and the character of the heating apparatus, etc.

After subjecting the assembly of metal base and butyl rubber, compounded with dimethylol phenol curative and sulfur as described to vulcanizing conditions, it is surprisingly found that such rubber stock is most firmly adhered to the metal base.

It is desired to emphasize that for purposes of the invention the adhesive butyl rubber stock containing the 2,6-dimethylol-4-hydrocarbyl phenol curative and sulfur must be in an uncured condition at the time that it is placed in intimate contact with the metal surface to which it is to be adhered. The adhesive bond between the butyl rubber composition of the invention and the metal base is developed during the vulcanization of the uncured stock in contact with the metal base.

The invention is applicable to bases of cuprous metal in general, that is, copper and copper containing alloys such as the brasses and bronzes, or to other metals coated or plated with copper, brasses, bronzes or other copper containing alloy.

The invention is applicable to the manufacture of various composite articles such as rubber-lined pipes, tanks or similar equipment, wherein the butyl rubber adhesive composition of the invention containing the dimethylol phenol curative and sulfur may serve both as the lining and the adhesive (or may serve merely as an intermediate adhesive layer for securing another rubber, such as a conventional resin-curing butyl rubber composition).

The adhesive composition of the invention may be applied to wire or similar reinforcement for all sorts of articles, including wire breaker fabric or wire carcass fabric for pneumatic tires, wire reinforcement for conveyor belts or power transmission belts, etc.

Perhaps one of the most remarkable advantages of the invention lies in the ability of the adhesive bond formed by the present method to maintain the greater proportion of its strength even when subjected to elevated temperatures. In general, it is more difficult by conventional methods to obtain a bond that is sufficiently strong at elevated temperatures than it is to obtain a strong bond at room temperature. The method of the invention surprisingly provides adequate adhesion even when the laminate is subjected to quite highly elevated temperatures, such as temperatures of 250° F.

The following example, in which all parts are expressed by weight, will serve to illustrate the practice of the invention in more detail.

Example

The following butyl stock rubber was mixed:

| | Parts |
|---|---|
| Butyl rubber ("Butyl 218," a commercially available copolymer of 1.78% isoprene and 98.22% isobutylene) | 100.00 |
| Polychloroprene rubber ("Neoprene W," included as an accelerator for the resinous curative) | 10.00 |
| Carbon black ("Philblack O") | 60.00 |
| Cellulose flock ("Solka Floc BW–40") | 3.00 |
| Stearic acid | 1.00 |
| Dimethylol phenol curative ("Amberol ST–137," a resinous self-condensation product of 2,6-dimethylol-4-tert. butyl phenol) | 12.00 |
| Sulfur | 2.00 |

The stock was laminated with steel bead wire having a minimum modulus of elasticity of 24,000,000 p.s.i., and having a bronze plating of 0.5–1.25 grams per kilogram of wire. This laminate was prepared in accordance with the standard adhesion testing method known as the H adhesion test. The laminate was then subjected to vulcanization at a temperature of 350° F., for a period of 15 minutes. After curing, the laminate was tested to determine the strength of the adhesive bond between the cured butyl rubber stock, containing the resinous dimethylol phenol curative and sulfur, and the bronze plated wire. An average H adhesion of 21.5 lbs. was obtained when the test was carried out at room temperature (70° C.). In direct contrast to this, in similarly prepared butyl rubber samples containing the dimethylol phenol resin curative, but no sulfur, the bronze plated wire could be lifted by hand from the samples.

The illustrated butyl rubber-bronze plated wire laminate of the invention also furnished a remarkably strong adhesive bond at elevated temperature, viz., 15.75 lbs. at a temperature of 250° F. The adhesion of similar stocks containing no sulfur was so negligible that the wire could be removed by hand before the laminate could be tested at 250° F.

Similar results are obtained when the polychloroprene used as accelerator for the resinous curative is replaced by other accelerators for such curative, as disclosed above.

Having thus described my invention, what I claim and desire to protect by Letters Patent is:

1. A method of adhering to a cuprous metal base a rubbery copolymer of isobutylene and isoprene, the said rubbery copolymer containing from 0.5 to 5% of combined isoprene, comprising compounding 100 parts of the said rubbery copolymer with from 5 to 12 parts of a resinous self-condensation product of a 2,6-dimethylol-4-hydrocarbyl phenol as a curative for said rubbery copolymer, said compounding being carried out under such conditions that the said curative and the said copolymer remain in an unreacted state of mere physical admixture, and with from 1 to 5 parts of sulfur, the resulting composition being devoid of organic accelerator of sulfur vulcanization and containing both the said condensation product and sulfur together as such in the copolymer in the unreacted state, applying the resulting composition to the said metal base in direct contact with the surface of said base, and thereafter subjecting the resulting assembly to vulcanizing conditions.

2. A method as in claim 1, in which the said 2,6-dimethylol-4-hydrocarbyl phenol is a 2,6-dimethylol-4-lower alkyl phenol.

3. A method of adhering a cuprous metal base to a rubbery copolymer of isobutylene and isoprene, the said rubbery copolymer containing from 0.5 to 10% of combined isoprene, comprising compounding 100 parts of the said rubbery copolymer with from 5 to 12 parts of a resinous self-condensation product of a 2,6-dimethylol-4-hydrocarbyl phenol as a curative for the said rubbery copolymer, said compounding being carried out under such conditions that the said curative and the said copolymer remain in an unreacted state of mere physical admixture, from 0.3 to 20 parts of an accelerator for the said resinous curative, and from 1 to 5 parts of sulfur, the resulting composition being devoid of organic accelerator of sulfur vulcanization and containing both the said condensation product and sulfur together as such in the copolymer in the unreacted state, applying the resulting composition to the said metal base in direct contact with the surface of said base, and thereafter subjecting the resulting assembly to vulcanizing conditions.

4. A method of adhering a cuprous metal base to a rubbery copolymer of isobutylene and isoprene, the said rubbery copolymer containing from 0.5 to 10% of combined isoprene, comprising compounding 100 parts of the said rubbery copolymer with from 5 to 12 parts of a resinous self-condensation product of a 2,6-dimethylol-4-hydrocarbyl phenol as a curative for the said rubbery copolymer, said compounding being carried out under such conditions that the said curative and the said copolymer remain in an unreacted state of mere physical admixture, from 0.3 to 20 parts of polychloroprene as an accelerator for the said resinous curative, and from 1 to 5 parts of sulfur, the resulting composition being devoid of organic accelerator or sulfur vulcanization and containing both the said condensation product and sulfur together as such in the copolymer in the unreacted state, applying the resulting composition to the said metal base in direct contact with the surface of said base, and thereafter subjecting the resulting assembly to vulcanizing conditions.

5. A method as in claim 1, in which the said 2,6-dimethylol-4-hydrocarbyl phenol is a 2,6-dimethylol-4-lower alkyl phenol.

6. A method as in claim 2, in which the said 2,6-dimethylol-4-hydrocarbyl phenol is a 2,6-dimethylol-4-lower alkyl phenol.

References Cited in the file of this patent

UNITED STATES PATENTS

| | | |
|---|---|---|
| 2,587,430 | Baldwin | Feb. 26, 1952 |
| 2,702,286 | Iknayan et al. | Feb. 15, 1955 |
| 2,702,287 | Iknayan et al. | Feb. 15, 1955 |
| 2,727,874 | Peterson et al. | Dec. 20, 1955 |
| 2,734,877 | Batts et al. | Feb. 14, 1956 |
| 2,788,839 | Kindle et al. | Apr. 16, 1957 |
| 2,839,443 | Fleming | June 17, 1958 |